Nov. 17, 1925.
A. KARPENKO
1,561,547
HOG'S HEAD CUTTER
Filed March 5, 1925
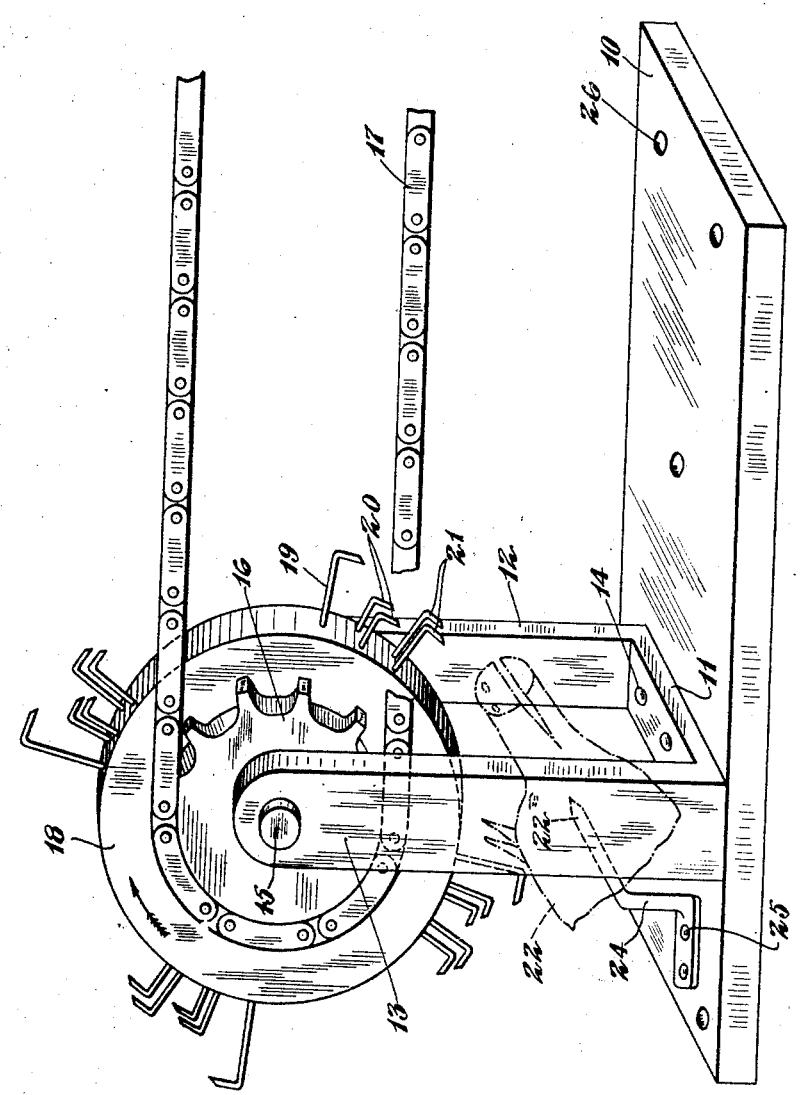
Inventor
Archip Karpenko Patented Nov. 17, 1925.

1,561,547

UNITED STATES PATENT OFFICE.

ARCHIP KARPENKO, OF NEW YORK, N. Y.

HOG'S-HEAD CUTTER.

Application filed March 5, 1925. Serial No. 13,156.

*To all whom it may concern:*

Be it known that I, ARCHIP KARPENKO, a citizen of Russia, and resident of New York, in the county of New York and State of New York, have invented certain new and useful Hog's-Head Cutters, of which the following is a specification.

This invention relates to improvements in apparatus used in slaughtering animals for food purposes, more particularly for dressing and dividing or cutting up hogs' heads. It is the principal object of my invention to provide an apparatus of this type which in a series of operations breaks the jaws, removes the skin, and divides the meat or removes it from the bones.

Another object of the invention is the provision of an apparatus of this type which is of simple and inexpensive construction and motor-operated.

A further object of the invention is the provision of a hog's head dividing mechanism in which the head is supported on a suitable spear and exposed to the operation of a plurality of rotating tools.

These and other objects of my invention will become more fully known as the description proceeds, and will then be more specifically pointed out in the appended claims.

In the accompanying drawing forming a material part of this disclosure:

The single figure illustrates by way of example in elevation, an apparatus constructed according to my invention.

On a platform 10, a U-frame having a base 11 and parallel upstanding standards 12 and 13 is secured by bolts 14 passing through the U-bar or in any other well known manner, to the base or platform 10 near one end thereof.

The upper ends of the standards constitute a bearing for a shaft 15 rotatably journaled therein, and carrying a sprocket wheel 16 thereon, near one of the standards over which a chain 17 is guided which is operated from any suitable source of power in the customary well known manner.

A drum 18 or wheel is also carried by the shaft 15 and is laterally disposed thereon to the sprocket wheel 16.

This drum carries on its outer periphery a plurality of tools arranged in sets, each set comprising a large hook 19 constituting a jaw breaker, a pair of smaller hooks 20 constituting skin removers and a pair of hooks 21 adapted to engage into the nostrils of the hog for removing the meat from the bone.

The head of the hog, indicated at 22, is attached to the outer sharpened spear-end 23 and exposed to the operation of the tools. A bracket 24 is made integrally with the spear and secured to the platform 10 as indicated at 25. The platform can be fastened to the floor or any other support by means of suitable fastening means passing through holes 26 in said platform.

The apparatus operates as follows:

Upon the rotation of the wheel 16 and shaft 15, the hooks 21 will engage the nostrils of the animal, the head of which is exposed to the operation of the tools on spear 23, and will remove the meat from the bones, the hooks 20 will remove the skin still adhering to the bones, and the hook 19 will break the jaw bones apart. This operation is repeated as often as necessary to perform the work, whereupon a new head is placed on the spear.

It will be clear that changes may be made in the general arrangement and in the construction of the minor details of my invention without departure from the scope and spirit of my invention.

What I claim as new and desire to secure by Letters Patent is:

1. A tool for tearing hog heads apart comprising a base, a drum, a means for rotating said drum, a tool on said drum for removing the meat, a tool for removing the skin, and a tool for breaking the jaw bones on said drum, and a means for exposing a hog's head to the action of the said tools.

2. A hog's head dressing tool comprising a base, a drum rotatably mounted on said base, sets of tools on the outer periphery of said drum, and a means on said base for exposing a hog's head successively to the operation of said sets of tools.

3. A hog's head dividing apparatus comprising a base, a U-frame on said base, a drum rotatably mounted on said frame, a means for rotating said drum, a plurality of sets of tools on said drum adapted to skin, removing the meat and breaking the jaw bones of said head, and a means for exposing a hog's head to the operation of said sets of tools successively during the rotation of said drum.

4. A slaughter house apparatus comprising a base, adapted to be secured to a support, a U-frame secured on said base near one end thereof, a horizontal shaft journaled in said U-frame near to its upper end, a sprocket wheel on said shaft, a chain guided over said wheel to rotate said shaft, a drum on said shaft, a plurality of sets of hook-tools arranged on the outer periphery of said drum in spaced relation, each of said sets comprising a long hook for breaking the jaw bone of the head, a pair of small hooks for removing the skin and a pair of hooks for engaging the nostrils to remove the meat, and a spear adapted to carry a hog's head and exposing the same successively to the action of said tools, and means for securing said spear on said base.

Signed at New York, in the county of New York and State of New York, this 28th day of February, A. D. 1925.

ARCHIP KARPENKO.